(12) United States Patent
Mitsugi

(10) Patent No.: US 9,019,417 B2
(45) Date of Patent: Apr. 28, 2015

(54) IMAGING SYSTEM, IMAGING DEVICE AND DISPLAY DEVICE UTILIZING IMAGING CONDITIONS ALTERABLE ACCORDING TO DISPLAY CONDITIONS

(75) Inventor: Tatsuya Mitsugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 73 days.

(21) Appl. No.: 13/696,768

(22) PCT Filed: Jun. 9, 2010

(86) PCT No.: PCT/JP2010/003829
§ 371 (c)(1),
(2), (4) Date: Nov. 7, 2012

(87) PCT Pub. No.: WO2011/154997
PCT Pub. Date: Dec. 15, 2011

(65) Prior Publication Data
US 2013/0057723 A1     Mar. 7, 2013

(51) Int. Cl.
| | | |
|---|---|---|
| H04N 5/222 | (2006.01) | |
| H04N 9/68 | (2006.01) | |
| G06F 3/038 | (2013.01) | |
| G09G 5/00 | (2006.01) | |
| H04N 7/18 | (2006.01) | |

(Continued)

(52) U.S. Cl.
CPC ................ *H04N 7/18* (2013.01); *H04N 5/232* (2013.01); *H04N 5/23293* (2013.01); *H04N 5/235* (2013.01)

(58) Field of Classification Search
CPC .............. H04N 5/23293; H04N 5/772; H04N 21/44008; H04N 5/232; H04N 5/2354; H04N 5/2621; H04N 5/77; H04N 1/00161; H04N 21/4122; H04N 21/4131; H04N 5/57
USPC ........ 348/333.01–333.13, 236, 238; 345/204, 345/690, 76, 77, 102
See application file for complete search history.

(56) References Cited

U.S. PATENT DOCUMENTS

| | | | | |
|---|---|---|---|---|
| 5,566,247 A | * | 10/1996 | Watanabe et al. | ............. 382/155 |
| 5,605,153 A | * | 2/1997 | Fujioka et al. | ................ 600/425 |
| 6,784,936 B1 | | 8/2004 | Fukushima et al. | |

(Continued)

FOREIGN PATENT DOCUMENTS

| | | |
|---|---|---|
| EP | 1505567 A1 | 2/2005 |
| JP | 9-200595 A | 7/1997 |

(Continued)

*Primary Examiner* — Chia-Wei A Chen
(74) *Attorney, Agent, or Firm* — Birch, Stewart, Kolasch & Birch, LLP

(57) ABSTRACT

An object is to provide an imaging system for taking an image of a subject with high reproducibility. It includes an imaging device for taking a picture in accordance with imaging conditions which are set values concerning imaging, a display device for displaying the image taken with the imaging device in accordance with display conditions which are set values concerning display, and an imaging condition decision unit for determining imaging conditions corresponding to the display conditions. When the display device alters the display conditions, the imaging condition decision unit determines the imaging conditions corresponding to the display conditions after the alteration, and the imaging device alters the imaging conditions stored in an imaging condition altering unit to the imaging conditions the imaging condition decision unit determines.

11 Claims, 9 Drawing Sheets

(51) Int. Cl.
*H04N 5/232* (2006.01)
*H04N 5/235* (2006.01)

(56) References Cited

U.S. PATENT DOCUMENTS

| | | | |
|---|---|---|---|
| 7,372,474 B2 | 5/2008 | Kurita et al. | |
| 7,982,791 B2* | 7/2011 | Nonaka et al. | 348/333.01 |
| 8,643,760 B2* | 2/2014 | Wang et al. | 348/333.11 |
| 2003/0039386 A1* | 2/2003 | Ishitani et al. | 382/141 |
| 2005/0270398 A1* | 12/2005 | Hibino | 348/333.01 |
| 2007/0171282 A1* | 7/2007 | Yanagi | 348/207.99 |
| 2009/0087016 A1* | 4/2009 | Berestov et al. | 382/100 |
| 2009/0262211 A1* | 10/2009 | Mori | 348/222.1 |
| 2009/0268052 A1* | 10/2009 | Takahashi | 348/223.1 |
| 2009/0322948 A1* | 12/2009 | Funabiki et al. | 348/571 |
| 2010/0110215 A1* | 5/2010 | Akita et al. | 348/222.1 |
| 2010/0123794 A1* | 5/2010 | Bok et al. | 348/223.1 |
| 2011/0090391 A1* | 4/2011 | Honjo et al. | 348/333.05 |
| 2011/0296340 A1* | 12/2011 | Nakagawa | 715/783 |
| 2012/0096496 A1* | 4/2012 | Dawson | 725/40 |
| 2012/0200708 A1* | 8/2012 | Fukuda | 348/148 |
| 2013/0004073 A1* | 1/2013 | Yamaji et al. | 382/173 |
| 2013/0162647 A1* | 6/2013 | Shirai | 345/428 |
| 2013/0215135 A1* | 8/2013 | Hirabayashi et al. | 345/589 |

FOREIGN PATENT DOCUMENTS

| | | |
|---|---|---|
| JP | 2000-50131 A | 2/2000 |
| JP | 2006-30713 A | 2/2006 |
| JP | 2007-178831 A | 7/2007 |
| JP | 2008-61040 A | 3/2008 |
| JP | 2010-10748 A | 1/2010 |

* cited by examiner

US 9,019,417 B2

IMAGING SYSTEM, IMAGING DEVICE AND DISPLAY DEVICE UTILIZING IMAGING CONDITIONS ALTERABLE ACCORDING TO DISPLAY CONDITIONS

TECHNICAL FIELD

The present invention relates to an imaging system, imaging device and display device, the imaging system having an imaging device for acquiring an image in accordance with imaging conditions and a display device for displaying the image acquired, and altering imaging conditions in response to a change of display conditions of the display device so as to be able to display appropriately according to the display conditions after the change.

BACKGROUND ART

In a system having an imaging device for acquiring an image and a display device for displaying the image acquired with the imaging device, the imaging device acquires a subject under imaging conditions set and generates an image signal, and the display device displays an image based on the image signal in accordance with display conditions set. However, since the imaging conditions of the imaging device are set separately from the display conditions of the display device, unless matching is established between the imaging conditions and the display conditions, the display device cannot display the image appropriately. Accordingly, there is an image display system that displays an image appropriately by altering display conditions in accordance with the imaging conditions at the time when the imaging device takes a picture of a subject (Patent Document 1).

PRIOR ART DOCUMENT

Patent Document

Patent Document 1: Japanese Patent Laid-Open No. 2007-178831.

DISCLOSURE OF THE INVENTION

Problems To Be Solved by the Invention

However, in the image display system disclosed in the Patent Document 1, the display device corrects, according to the display conditions, an image signal acquired by taking a picture of a subject under any given imaging conditions. Depending on a value such as a dynamic range which is set as the imaging conditions, information that cannot be acquired in a picture at that value is not contained in the image signal in the first place. Accordingly, to compensate for such information that is not contained in the image signal sufficiently cannot be achieved by only altering display settings in the display device. Therefore it has a problem of low reproducibility of the subject in the image.

The present invention is implemented to solve the foregoing problem. Therefore it is an object of the present invention to provide an imaging system capable of increasing the reproducibility of a subject in the image.

Means for Solving Problems

An imaging system in accordance with the present invention comprises an imaging device including an imaging condition storage unit for storing imaging conditions which are set values concerning imaging, an imaging unit for taking a picture of a subject in accordance of the imaging conditions stored in the imaging condition storage unit and for generating an image signal, a communication unit for communicating with a display device for displaying the image signal, and an imaging condition altering unit for altering the imaging conditions stored in the imaging condition storage unit in accordance with information the communication unit receives; a display device including a communication unit for communicating with the imaging device, a display condition storage unit for storing display conditions which are set values concerning display, a display unit for displaying the image signal the communication unit receives in accordance with the display conditions stored in the display condition storage unit, and a display condition altering unit for altering the display conditions stored in the display condition storage unit; and an imaging condition decision unit for determining the imaging conditions corresponding to the display conditions, wherein in the display device which provides relationships between the display conditions and the imaging conditions, when the display condition altering unit alters the display conditions stored in the display condition storage unit, the imaging condition decision unit determines the imaging conditions corresponding to the display conditions after the alteration, and in the imaging device, the imaging condition altering unit alters the imaging conditions stored in the imaging condition storage unit to the imaging conditions the imaging condition decision unit determines.

In addition, an imaging device in accordance with the present invention is an imaging device connected to a display device that displays an image in accordance with display conditions which are set values concerning display and that outputs the display conditions to an outside, and comprises: an imaging condition storage unit for storing imaging conditions which are set values concerning imaging; an imaging unit for taking a picture of a subject in accordance the imaging conditions stored in the imaging condition storage unit and for generating an image signal; a communication unit for supplying the image signal to the display device and for receiving the display conditions transmitted from the display device; an imaging condition decision unit for determining the imaging conditions corresponding to the display conditions the communication unit receives; and an imaging condition altering unit for altering the imaging conditions stored in the imaging condition storage unit to the imaging conditions the imaging condition decision unit determines.

In addition, a display device in accordance with the present invention is a display device connected to an imaging device that takes a picture in accordance with imaging conditions which are set values concerning imaging and that enables altering the imaging conditions from an outside, and comprises: a display condition storage unit for storing display conditions which are set values concerning display; a display unit for displaying an image the imaging device takes in accordance with the display conditions stored in the display condition storage unit; a display condition altering unit for altering the display conditions stored in the display condition storage unit; an imaging condition decision unit for determining the imaging conditions corresponding to the display conditions; and a communication unit for communicating with the imaging device, wherein when the display condition altering unit alters the display conditions stored in the display condition storage unit, the imaging condition decision unit determines the imaging conditions corresponding to the display conditions after alteration, and the communication unit transmits the imaging conditions to the imaging device.

Advantages of The Present Invention

According to the present invention, it can improve the reproducibility of a subject in an image.

EMBODIMENTS FOR CARRYING OUT THE INVENTION

Embodiment 1

Figure 1:
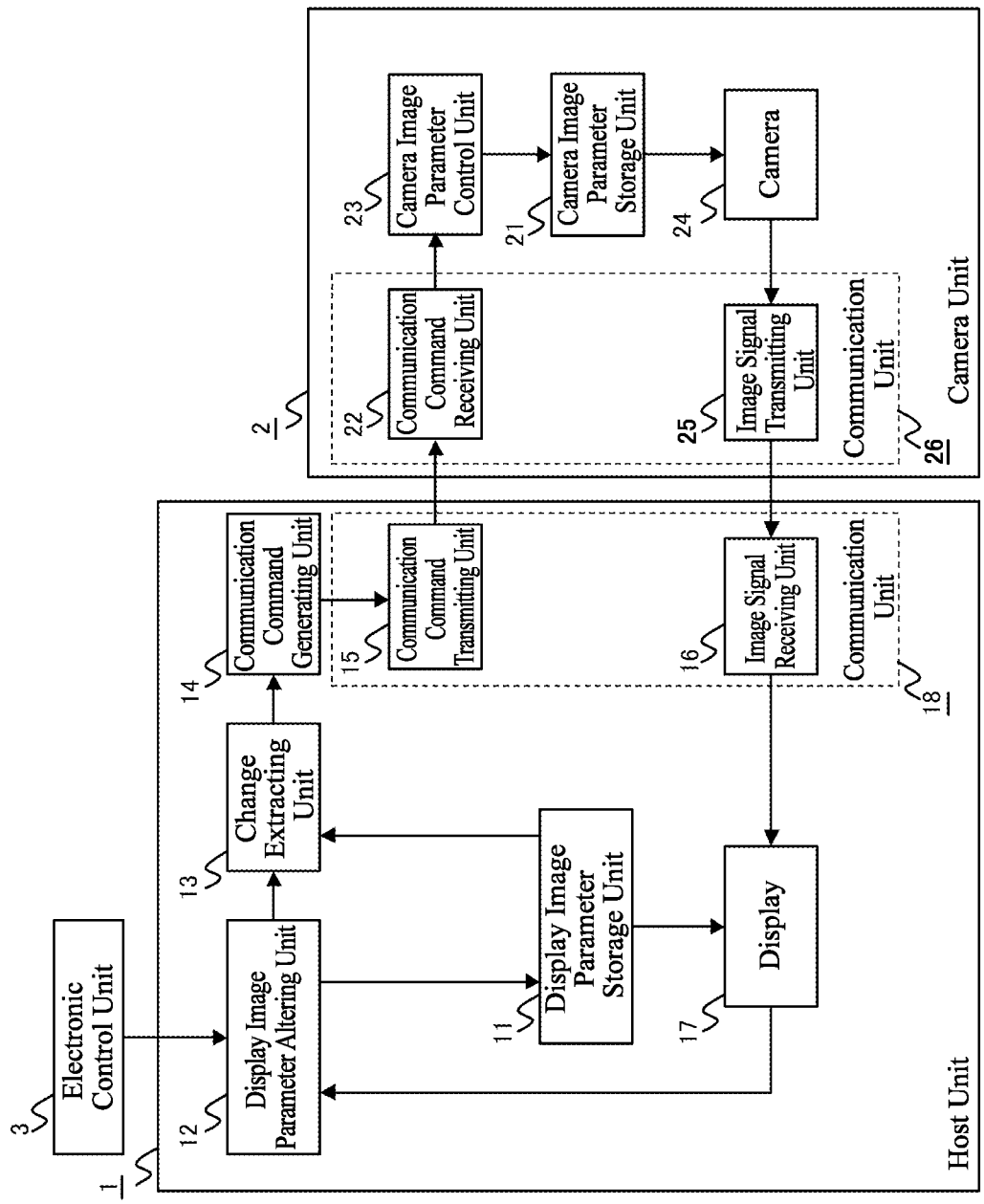
FIG. 1 is a block diagram showing a configuration of a camera system of an embodiment 1.

FIG. 1 is a block diagram showing a configuration of a camera system of an embodiment 1. A camera system of the present embodiment is an onboard camera system mounted in a vehicle. In FIG. 1, the camera system (imaging system) comprises a host unit 1 (display device) placed in the vehicle and a camera unit 2 (imaging device) connected to the host unit 1 for taking a picture around the vehicle. The camera system is provided for a driver to check surrounding conditions of the vehicle while the camera unit 2 takes pictures around the vehicle and the host unit 1 displays the picked-up pictures around the vehicle. An electronic control unit 3, which is an ECU (Electric Control Unit) mounted in a vehicle in general, detects measurement values of various measurement instruments mounted in the vehicle and outputs them as vehicle information. The host unit 1 carries out its processing using the vehicle information supplied from the electronic control unit 3.

The host unit 1 comprises a display 17 (display unit) for displaying an image; a display image parameter storage unit 11 (display condition storage unit) for storing display image parameters (display conditions) which are set values of parameters for causing the display 17 to display an image; a display image parameter altering unit 12 for altering display image parameters stored in the display image parameter storage unit 11; a change extracting unit 13 for extracting a changed parameter from the display image parameters stored in the display image parameter storage unit 11; a communication command generating unit 14 for deciding the manner of controlling the camera unit 2 from the changed display image parameters extracted by the change extracting unit 13 and for generating a communication command; a communication command transmitting unit 15 (imaging condition output unit) for transmitting the communication command generated by the communication command generating unit 14 to the camera unit 2; and an image signal receiving unit 16 for receiving from the camera unit 2 an image signal which will be described later.

In the present embodiment, the display image parameter altering unit 12 detects from the vehicle information supplied from the electronic control unit 3 an ILL signal (lighting signal) indicating that a driver of the vehicle operates its light switch to turn on the lamps mounted on the vehicle, and alters the display image parameters stored in the display image parameter storage unit 11 in response to the ILL signal detected. The image signal the image signal receiving unit 16 receives is displayed on the display 17 in accordance with the display image parameters stored in the display image parameter storage unit 11.

The communication command generating unit 14, which has reference values (normally default values) of the display image parameters, decides the manner of altering the parameters concerning the imaging of the camera unit 2 in accordance with differences from the reference values, and generates a command for notifying of the alteration.

The change extracting unit 13 and communication command generating unit 14 constitute an imaging condition decision unit for deciding imaging conditions indicating the manner in which the camera 24, which will be described later, captures an image according to the differences between the display image parameters stored in the display image parameter storage unit 11 and the reference values. In addition, the communication command transmitting unit 15 and image signal receiving unit 16 constitute a communication unit 18. Incidentally, as for the reference values, although it is assumed that the communication command generating unit 14 stores them, a configuration is also possible in which the display image parameter storage unit 11 stores them and the communication command generating unit 14 reads them when it generates the communication command. Alternatively, a configuration is also possible which has a separate component for storing the reference values and causes the communication command generating unit 14 to read them when it generates the communication command. Anyway, the host unit 1 has a reference display condition storage unit for storing the reference values of the display image parameters (display conditions).

The camera unit 2 comprises a camera image parameter storage unit 21 (imaging condition storage unit) for storing camera image parameters (imaging conditions) which are set values of parameters concerning the manner of taking an image with the camera, a communication command receiving unit 22 for receiving the communication command transmitted from the communication command transmitting unit 15 of the host unit 1, a camera image parameter control unit 23 (imaging condition altering unit) for altering the camera image parameters stored in the camera image parameter storage unit 21 in accordance with the communication command the communication command receiving unit 22 receives, a camera 24 (imaging unit) mounted on the vehicle for generating an image signal by taking a picture around the vehicle in accordance with the camera image parameters stored in the camera image parameter storage unit 21, and an image signal transmitting unit 25 for transmitting the image signal supplied from the camera 24 to the image signal receiving unit 16 of the host unit 1. Incidentally, a communication unit 26 comprises the communication command receiving unit 22 and image signal transmitting unit 25.

Figure 2:
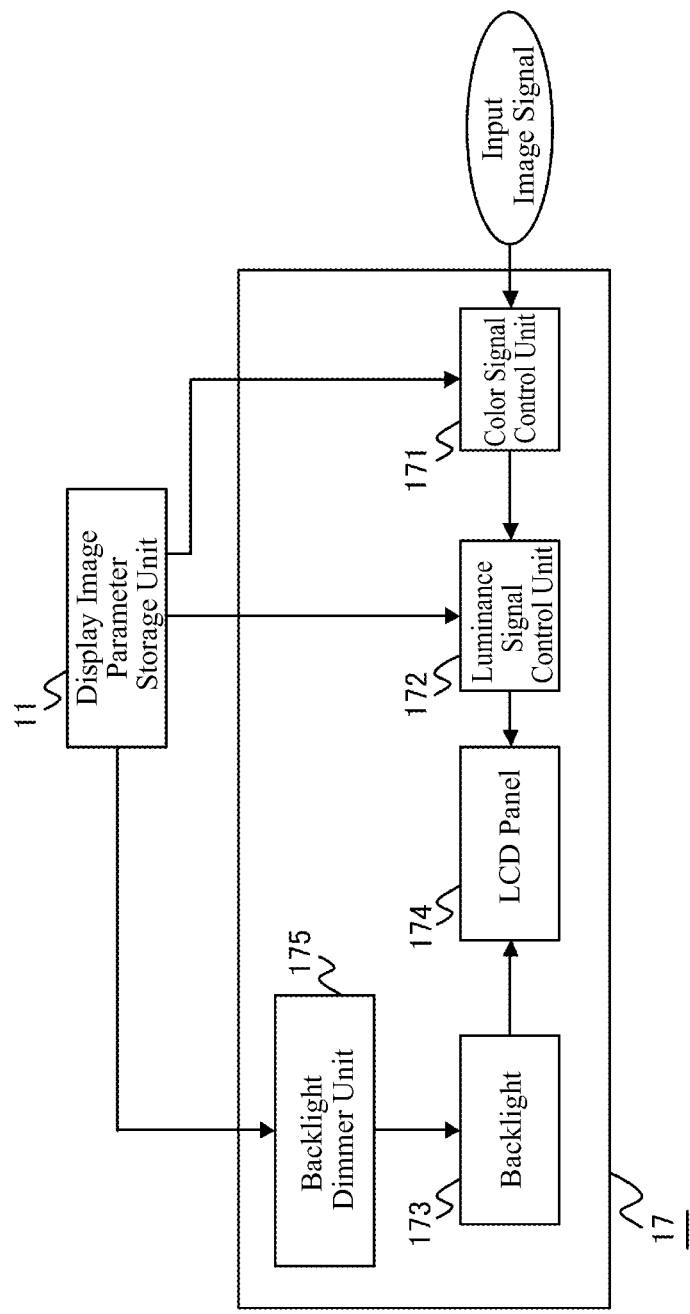
FIG. 2 is a block diagram showing a configuration of a display in the camera system of the embodiment 1.

FIG. 2 is a block diagram showing a configuration of the display 17. In FIG. 2, the display 17 comprises a color signal control unit 171 for controlling the color signal included in the image signal, a luminance signal control unit 172 for controlling the luminance signal included in the image signal, a backlight 173 working as a light source, an LCD panel 174 (image display component) for displaying an image obtained by modulating the light output from the backlight 173 in response to the image signal supplied from the luminance signal control unit 172, and a backlight dimmer unit 175 for controlling the intensity of emission of the backlight 173.

The display image parameter storage unit 11 stores the following display image parameters. The display image parameters can be divided to those relating to image quality and the others.

(Display Image Parameters Relating to Image Quality)
  (A1) Gamma curve control information.
  (A2) Noise compression control information.
  (A3) Color contour correcting information.
  (A4) Luminance contour correcting information.
  (A5) HUE (hue) control information.
  (A6) Color saturation control information.
  (A7) Contrast control information.
  (A8) Sharpness control information.
(Display Image Parameters Relating to Those Other Than Image Quality)
  (B1) Automatic color control information.
    Information for maintaining the intensity of the color signal at constant regardless of the intensity of the input signal.
  (B2) White peak control information.
    Information for maintaining the intensity of the luminance signal at constant regardless of the intensity of the input signal.
  (B3) Backlight dimmer information (emission intensity information).
    Information showing the intensity of emission of the backlight 175.
  (B4) Dot size information (resolution information) of the LCD panel 174.
  (B5) Frame rate information of the display 17.
  (B6) Color space information.
    Information showing a range of colors the display 17 can display.

The color signal control unit 171 controls the color signal included in the image signal in accordance with the (B1) automatic color control information, (A1) gamma curve control information, (A2) noise compression control information, (A3) color contour correcting information, (A5) HUE control information, (A6) color saturation control information, (A7) contrast control information, (A8) sharpness control information, (B4) resolution information of the LCD panel 174, and (B5) frame rate information among the parameters stored in the display image parameter storage unit 11.

The luminance signal control unit 172 controls the luminance signal included in the image signal in accordance with the (B2) white peak control information, (A1) gamma curve control information, (A2) noise compression control information, (A4) luminance contour correcting information, (A7) contrast control information, (A8) sharpness control information, (B4) resolution information of the LCD panel 174, (B5) frame rate information, and (B6) color space information among the parameters stored in the display image parameter storage unit 11.

The backlight dimmer unit 175 controls the brightness of the LCD panel 174 as a whole by adjusting the intensity of emission of the backlight 173 in accordance with the (B3) backlight dimmer information stored in the display image parameter storage unit 11. Incidentally, since the color space and resolution differ depending on the type of the LCD panel 174, it is desirable to control the image signal in accordance with the type of the LCD panel 174. Accordingly, the display image parameter altering unit 12 acquires panel type information indicating the type of the LCD panel 174, and alters the (B4) resolution information of the LCD panel 174, (B5) frame rate information, and (B6) color space information among the display image parameters stored in the display image parameter storage unit 11 to the values determined in advance in accordance with the panel type information acquired. In this way, it can reproduce a subject taken with the camera on the display faithfully by altering the display image parameters in accordance with the type of the LCD panel, by adjusting the image signal with the color signal control unit 171 and luminance signal control unit 172, and by adjusting the intensity of emission of the backlight 173 with the backlight dimmer unit 175.

The camera image parameter storage unit 21 of the camera unit 2 stores the following camera image parameters. As for the camera image parameters, at least those relating to the image quality and those relating to the imaging are stored.

(Camera Image Parameters Relating to Image Quality)
  (C1) Gamma curve control information.
  (C2) Filtering switching information.
  (C3) Contour emphasis step number switching information.
  (C4) HUE (hue) control information.
  (C5) Color saturation control information.
  (C6) Contrast control information.
  (C7) Sharpness control information.
  (C8) Shading control information.
  (C9) Black-and-white level control information.
(Camera Image Parameters Relating to Imaging)
  (D1) Information on auto-function of the camera.
  (D2) Imaging screen size information of the camera.
  (D3) Imaging frame rate information of the camera.

The (D1) information on the auto-function of the camera is the following set values set in the camera about imaging.

(Auto-Function Information of Camera)
  (E1) AE (Automatic Exposure) Setting Information.
    It includes parameters such as an exposure area, brightness of convergence and temporal change to the brightness of convergence.
  (E2) AWB (Automatic White Balance) Setting Information.
    It includes parameters such as a balance area, a color space of convergence and temporal change to the color space of convergence.
  (E3) AGC (Automatic Gain Control) Setting Information.
  (E4) BLC (Black Level Control) Setting Information.

Figure 3:
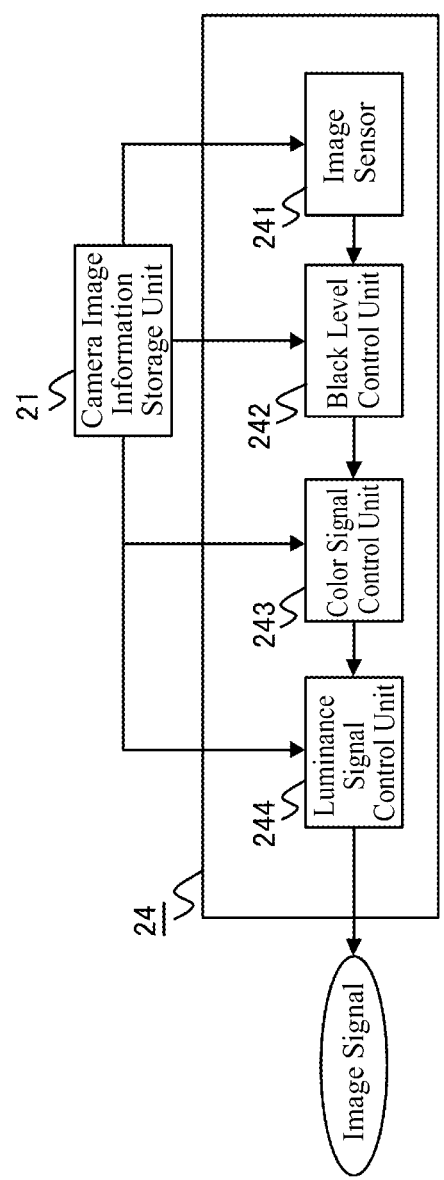
FIG. 3 is a block diagram showing a configuration of a camera in the camera system of the embodiment 1.

FIG. 3 is a block diagram showing a configuration of the camera 24. The camera 24 comprises an image sensor 241 such as a solid-state imaging device that takes a picture of a subject and outputs as the image signal, a black level control unit 242 for controlling the black level of the image signal, a color signal control unit 243 for controlling the color signal included in the image signal passing through the control of the black level control unit 242, and a luminance signal control unit 244 for controlling the luminance signal included in the image signal supplied from the color signal control unit 243. The image sensor 241 takes a picture of a subject in accordance with the (E1) AE setting information, (E2) AWB setting information, (E3) AGC setting information, and (E4) BLC setting information among the parameters stored in the camera image parameter storage unit 21. In particular, the image sensor 241 has functions of the automatic exposure (AE) and automatic white balance (AWB), and controls the automatic exposure and automatic white balance in accordance with the (E1) AE setting information and (E2) AWB setting information stored in the camera image parameter storage unit 21, thereby being able to obtain an image with the optimum color state in the optimum exposure state.

The black level control unit 242 controls the brightness of the blackest portion of the image in accordance with the (C9) black-and-white level information stored in the camera image parameter storage unit 21. The color signal control unit 243 controls the color signal included in the image signal in accordance with the (C1) gamma curve control information, (C2) filtering switching information, (C3) contour emphasis step number switching information, (C4) HUE control information, (C5) color saturation control information, (C6) contrast control information, (C7) sharpness control information, (C8) shading control information and (C9) black-and-white level control information.

The luminance signal control unit 244 controls the luminance signal included in the image signal in accordance with the (C1) gamma curve control information, (C2) filtering switching information, (C6) contrast control information, (C7) sharpness control information, (C8) shading control information and (C9) black-and-white level control information. The image signal adjusted by the luminance signal control unit 244 is delivered from the image signal transmitting unit 25 to the host unit 1. In this way, the camera 24 generates and outputs the image signal in accordance with the camera image parameters stored in the camera image parameter storage unit 21. Incidentally, the resolution of the image given by the image signal varies according to the type of the image sensor.

Next, the operation of the camera system of the present embodiment will be described.

For example, when the sun goes down and the surroundings of the vehicle grow dark and if an image is displayed at the same luminance as in the daytime, the driver will feel the image dazzling which is displayed on the display 17. Accordingly, when the surroundings of the vehicle grow dark, the image displayed on the display 17 is made darker. The camera system of the present embodiment makes a decision that the surroundings of the vehicle grow dark using the ILL signal output from the electronic control unit 3. The ILL signal, which is the signal indicating that the lamps mounted on the vehicle are turned on, is output from the electronic control unit 3 that detects the operation of the light switch when the driver operates it to turn on the lamps. Since the driver of the vehicle operates the light switch to turn on the lamps mounted on the vehicle when the surroundings of the vehicle grow dark, detecting the ILL signal enables detecting that the surroundings of the vehicle become dark. Incidentally, the ILL signal is in the ON state when it indicates that the lamps mounted on the vehicle are turned on.

The display image parameter altering unit 12 detects the ILL signal the electronic control unit 3 outputs. If the ILL signal changes its state from the OFF state to ON state, it alters the backlight dimmer information stored in the display image parameter storage unit 11 in order to reduce the intensity of emission of the backlight 173 of the display 17. In addition, the display image parameter altering unit 12 supplies the change extracting unit 13 with alteration notification that it alters the display image parameters stored in the display image parameter storage unit 11. The display image parameter altering unit 12 also works as a lighting signal acquiring unit for acquiring the lighting signal indicating that the lamps on the vehicle are turned on or off.

Figure 4:
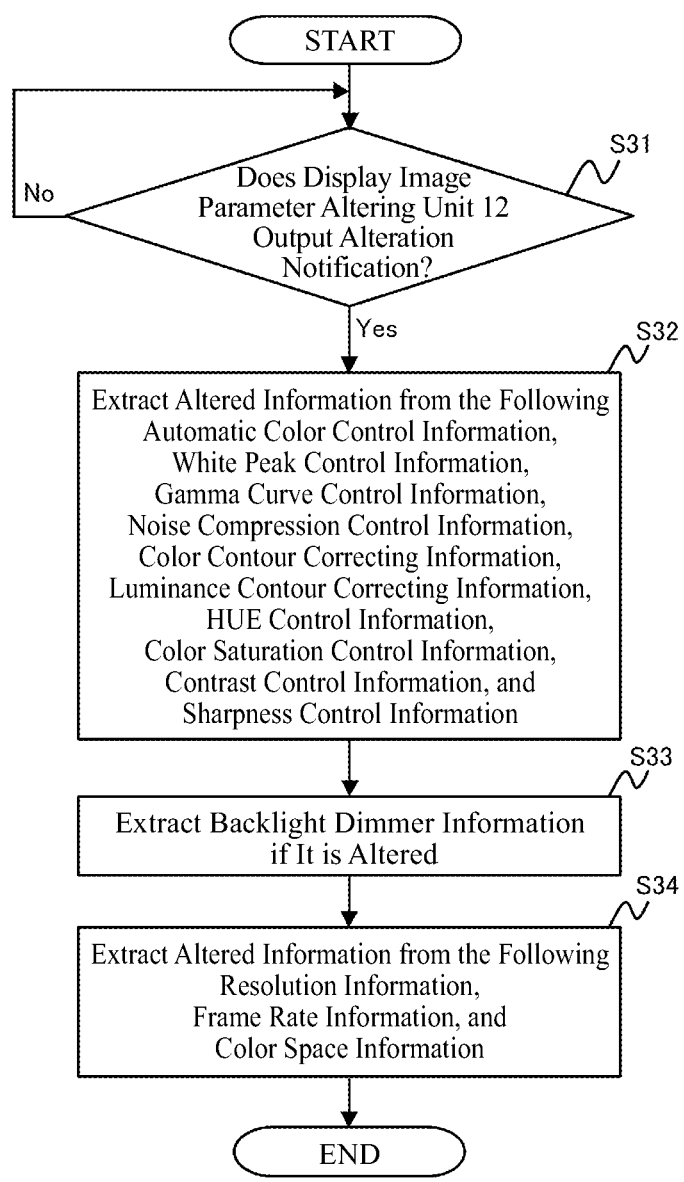
FIG. 4 is a flowchart showing the operation of a change extracting unit in the camera system of the embodiment 1.

FIG. 4 is a flowchart showing the operation of the change extracting unit 13. When the display image parameter altering unit 12 outputs the alteration notification (S31), the change extracting unit 13 extracts a changed parameter from the parameters stored in the display image parameter storage unit 11 (S32-S34). When the backlight dimmer information is altered to reduce the intensity of emission of the backlight 173 as described above, the backlight dimmer information is extracted as a changed parameter.

Figure 5:
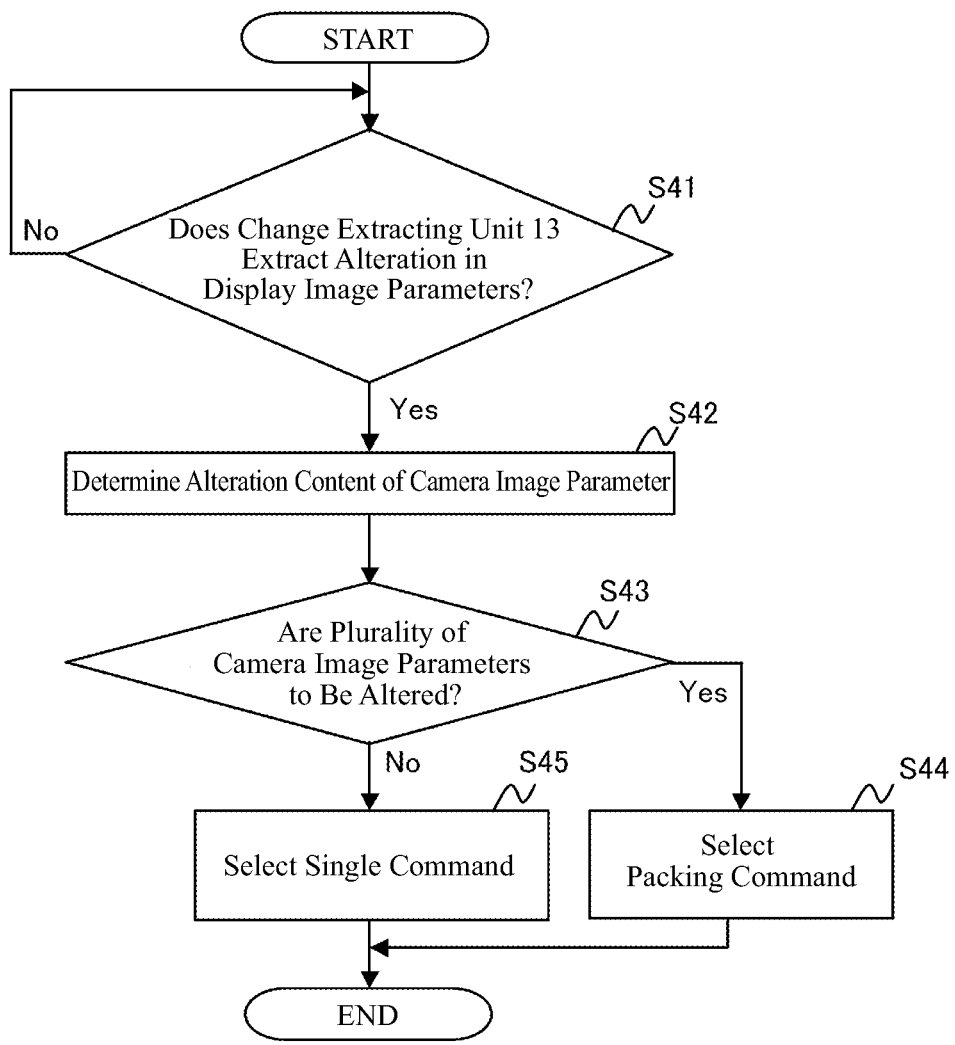
FIG. 5 is a flowchart showing the operation of a communication command generating unit in the camera system of the embodiment 1.

FIG. 5 is a flowchart showing the operation of the communication command generating unit 14. When the change extracting unit 13 extracts a changed display image parameter (S41), the communication command generating unit 14 obtains the difference of the extracted display image parameter from its reference value. Then, according to the difference, it decides the alteration content of the manner of altering the camera image parameters (S42). For example, when a parameter for causing the backlight 173 to emit at 100% intensity is set as the reference value of the backlight dimmer information, and if the backlight dimmer information is altered to a value that will cause the backlight 173 to emit at 50% intensity, it sets the dynamic range of gradation for the camera 24 to take a picture to a value lower than the current set value in accordance with the reduction or reduction ratio of the set value of the backlight dimmer information. To reduce the dynamic range, it lowers the luminance value (upper limit of the luminance range enabling taking a picture) corresponding to the brightest gradation in the image signal taken. To return the reduced dynamic range, it increases the upper limit of the luminance range enabling taking a picture.

When the intensity of emission of the backlight 173 is reduced, luminance differences between adjacent steps of the gradation in the image signal reduce, and the gradation steps in a dark portion with dark gradation in the image are difficult to distinguish from each other, thereby being seen as if blotted out in black. However, reducing the dynamic range of the gradation for the camera 24 to take a picture will enable increasing the resolution in the portion with low gradation, thereby being able to facilitate distinguishing the portion with low gradation even when the intensity of emission of the backlight 173 is low. To alter the dynamic range of the camera 24, it is necessary to alter among the camera image parameters (E1) AE setting information, (E2) AWB setting information, (E3) AGC setting information, (E4) BLC setting information, and (C9) black-and-white level control information. Accordingly, the communication command generating unit 14 determines the alteration contents for changing the five parameters.

Since the alteration contents thus determined involve altering a plurality of camera image parameters (Yes at step S43), the communication command generating unit 14 generates a packing command for altering a plurality of parameters (step S44). As an example of other processing, a configuration is also possible which sets in advance a command for starting an imaging mode of taking a picture in direct sunlight or an imaging mode of taking a picture at night, for example, and selects a command in accordance with the alteration contents of the display image parameters. Incidentally, when the alteration content determined is that which alters a single camera image parameter (No at step S43), it generates a command for altering the single parameter (step S45). The command generated is transmitted from the communication command transmitting unit 15 to the camera unit 2 as a communication command.

Figure 6:
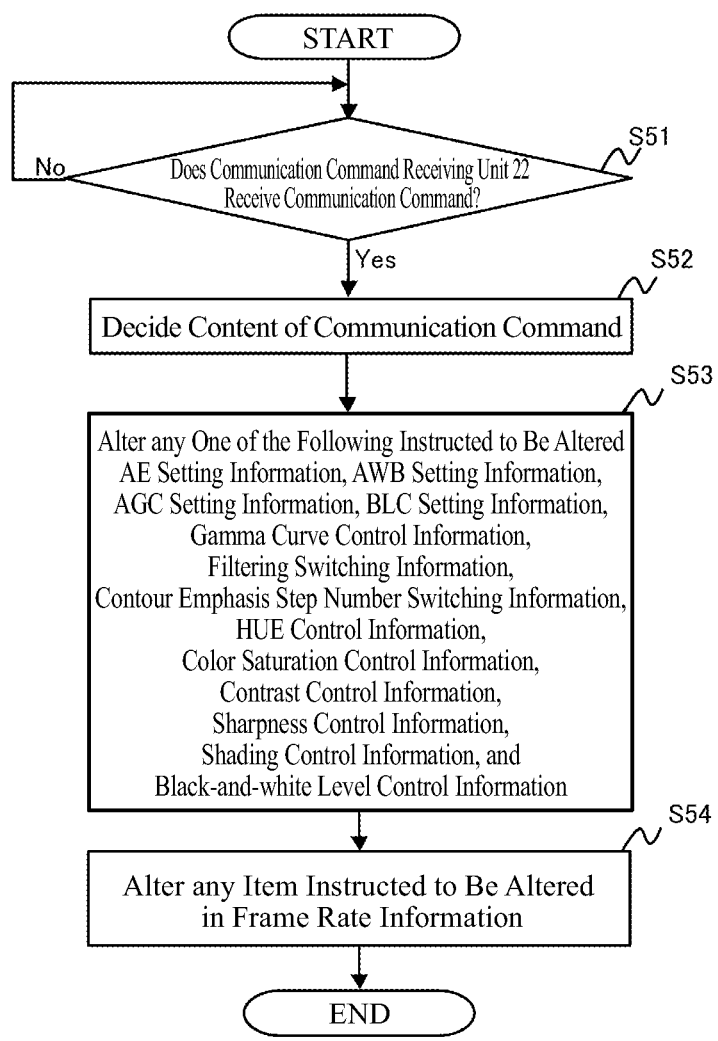
FIG. 6 is a flowchart showing the operation of a camera image parameter control unit in the camera system of the embodiment 1.

FIG. 6 is a flowchart showing the operation of the camera image parameter control unit 23. When the communication command receiving unit 22 receives the communication command (S51), the camera image parameter control unit 23 decides the contents of alteration instructed by the communication command (S52). Among the camera image parameters stored in the camera image parameter storage unit 21, it alters the camera image parameters instructed to be altered (S53 and S54). In the example described above, it alters the (E1) AE setting information, (E2) AWB setting information, (E3) AGC setting information, (E4) BLC setting information, and (C9) black-and-white level control information so as to set the dynamic range of the camera 24 at a value lower than the current value.

Incidentally, although the foregoing description is made byway of example that changes the ILL signal from the OFF state to the ON state, when it changes the ILL signal from the ON state to the OFF state, the operation corresponding to the changed direction will enable improving the viewability of the display on the display 17. More specifically, the display image parameter altering unit 12 alters the backlight dimmer information stored in the display image parameter storage unit 11 so as to increase the intensity of emission of the backlight 173, and the communication command generating unit 14 generates a command for altering the (E1) AE setting information, (E2) AWB setting information, (E3) AGC setting information, (E4) BLC setting information and (C9) black-and-white level control information so as to increase the dynamic range of the camera 24. This makes it possible to display an image in which gradation steps are separable in a bright portion without a white tarnish even when the intensity of emission of the backlight 173 increases and the image displayed on the display 17 grows brighter.

As described above, according to the camera system of the embodiment 1, since it is configured in such a manner that when the ILL signal changes its state, the camera system alters the backlight dimmer information so as to reduce or increase the intensity of emission of the backlight 173, and alters the dynamic range of the camera 24 for taking a picture in accordance with the difference from the reference value or with the change in the intensity of the emission, even when the intensity of emission of the backlight 173 varies and hence the brightness of the image displayed on the display 17 is changed, it can facilitate separation between gradation steps in a low gradation, dark portion when the brightness is made darker, and separation between gradation steps in a high gradation, bright portion when it is made brighter.

Incidentally, although the foregoing embodiment detects that the surroundings of the vehicle become dark by detecting the ILL signal, other methods can be used to detect it. For example, the display image parameter altering unit 12 can decide a time period such as morning, noon, evening and night from the present time and set the values of the display image parameters in accordance with the time period decided. More specifically, when it is 6 p.m. for example, it makes a decision of night and alters the backlight dimmer information so as to make the backlight of the display 17 darker, and when it is 7 a.m., it makes a decision of morning and alters the backlight dimmer information so as to make the backlight of the display 17 brighter. Incidentally, when the clock acquires the present time including a date (the month and day or the year, month and day), it can alter the time for deciding morning, noon, evening and night in accordance with the season decided from the date. Furthermore, it can calculate the time of sunrise and sunset from the present position of the vehicle and the date, and decide morning, noon, evening and night using the time of sunrise and sunset.

In addition, a configuration is also possible which determines the brightness of the display 17 by other methods. For example, it controls the brightness of the display 17 by calculating the position of the sun from the present date and time and by deciding the direction of the sunlight shining into the vehicle from the position of the vehicle and its direction of traveling. More specifically, when the sunlight shines into the vehicle, for example, since it becomes difficult to view an image if the backlight of the display 17 is dark, it alters the backlight dimmer information so as to brighten the backlight. This enables the display 17 to display an image appropriately in accordance with its environment.

In addition, the brightness of the display 17 can be determined by other methods. For example, a method is possible which controls the display image parameters in accordance with illuminance measured by an illuminance sensor for measuring illuminance around the display 17 mounted in the vehicle. For example, when the illuminance around the display 17 is low, it is hard to view an image when the backlight of the display 17 is bright. Accordingly, it alters the backlight dimmer information so as to darken the backlight. This enables the display 17 to display an image appropriately in accordance with the environment.

Furthermore, in the foregoing example, the display image parameter altering unit 12 is configured in such a manner as to alter the display image parameters stored in the display image parameter storage unit 11 in accordance with prescribed information such as the ILL signal and time information. The display information altering unit 12 can also be provided with a human interface for accepting alteration of the display image parameters by a user. Since the environment in which the display 17 is mounted is various and the image state a user likes is also various, it can be configured in such a manner as to deal with any given settings by the user.

Incidentally, the communication command generating unit 14 is configured in such a manner as to obtain the differences of the display image parameters from the prescribed reference values, and determines the camera image parameters in accordance with the differences. However, a configuration is also possible which obtains amounts of change of the newly set display image parameters from their previous set values, and alters the set camera image parameters by amounts corresponding to the amounts of change obtained.

Although the display device calculates the camera image parameters (imaging conditions) corresponding to the display conditions after the alteration in the case of the alteration of the display image parameters (display conditions), it is also possible to notify the imaging device of the alteration of the display conditions to cause the imaging device to calculate the imaging conditions and to alter to the imaging conditions it calculates.

Incidentally, although the embodiment 1 describes an example in which the camera system is mounted on the vehicle, the camera system is not limited to an onboard camera system.

The foregoing are also applicable to the other embodiments.

Embodiment 2

Figure 7:
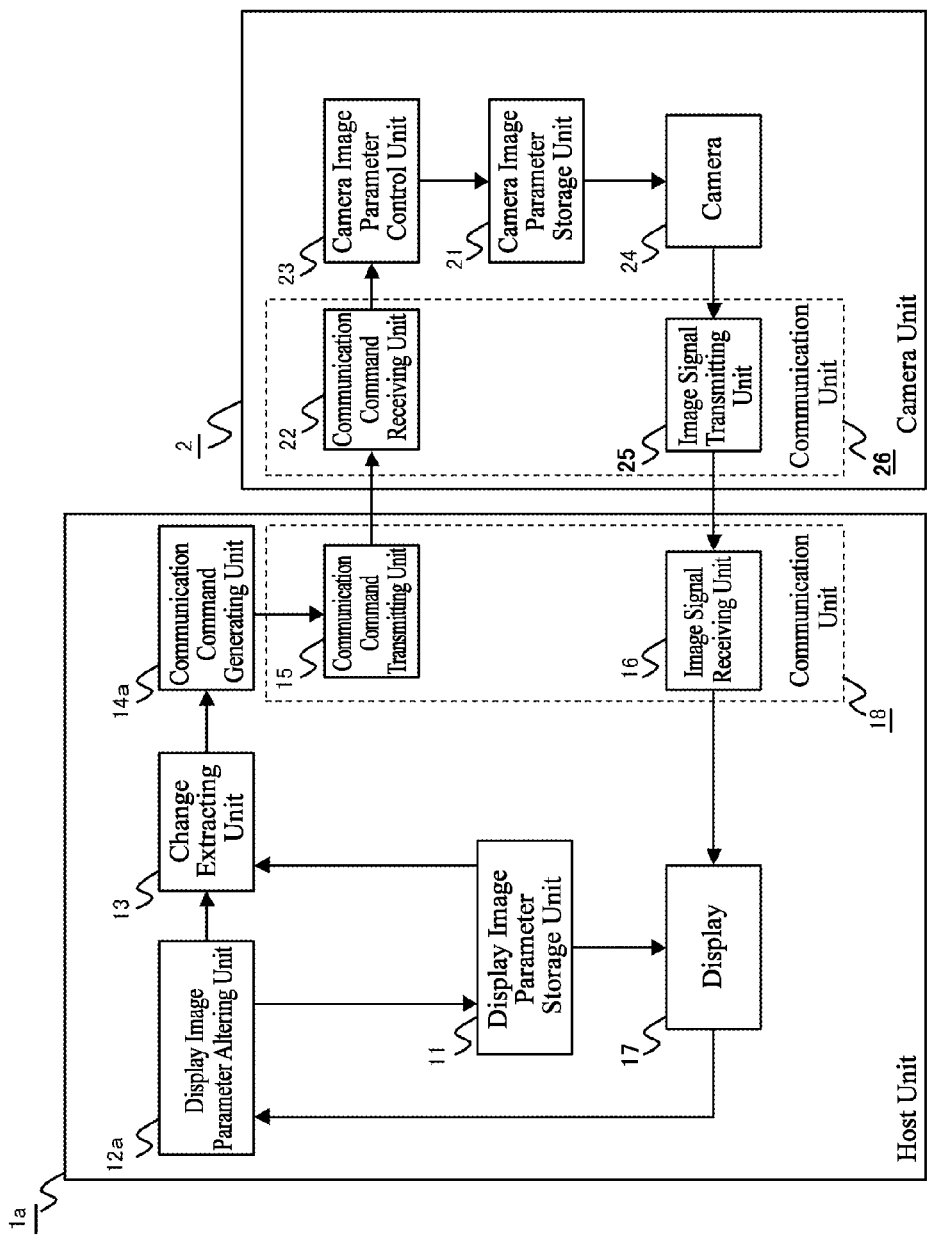
FIG. 7 is a block diagram showing a configuration of a camera system of an embodiment 2.

In a device such as a driving support device which takes a picture around a vehicle with a camera and displays conditions of the surroundings of the vehicle on a display installed in the vehicle, it is preferable that a subject be displayed exactly as a driver actually looks at it. For example, as for the (B1) automatic color control information of the display image parameters, although it is information relating to a color tone, altering the information will alter colors of the same image signal displayed on the display 17. For example, when the driver adjusts the (B1) automatic color control information to cause the display 17 to display somewhat redly, a subject which is white if the image signal is displayed as it is will be displayed in reddish white. Accordingly, when the (B1) automatic color control information is set to display a subject somewhat redly, the camera system of the present embodiment takes a picture of a white subject with the camera unit 2 so as to become bluish white, thereby causing the display 17 to display the white subject in white. FIG. 7 is a block diagram showing a configuration of the camera system of the embodiment 2. In FIG. 7, the same or like components to those of FIG. 1 are designated by the same reference numerals and their description will be omitted.

When a driver adjusts the automatic color control information to cause the display 17 to display somewhat redly using a display image parameter altering unit 12a having a human interface, the change extracting unit 13 detects the (B1) automatic color control information as an altered parameter. The communication command generating unit 14a stores as the reference value a value, at which a white subject is expressed correctly in white with respect to the (B1) automatic color control information, and obtains the difference from the reference value of the (B1) automatic color control information. Then, the communication command generating unit 14a decides the manner of altering the (B1) automatic color control information in accordance with the differences obtained. For example, in the foregoing example, it decides that the (B1) automatic color control information is altered to cause reddish automatic color control. Then, the communication command generating unit 14a determines the (E2) AWB setting information of the camera in such a manner as to generate the image signal that will cause the display 17 to display a white subject in white. In the example described above, it determines the (E2) AWB setting information in such a manner that the white subject will be taken in bluish white. More specifically, as for the difference of the (B1) automatic color control information, it obtains the (E2) AWB setting information that is altered necessarily and sufficiently to cancel out the difference. Then, it creates a communication command for altering to that value and transmits it from the communication command transmitting unit 15 to the camera unit 2.

In the camera unit 2, the communication command receiving unit 22 receives the communication command indicating the (E2) AWB setting information, and the camera image parameter control unit 23 alters the (E2) AWB setting information stored in the camera image parameter storage unit 21 according to the communication command received. Thus, the camera 24 outputs the image signal obtained by taking a subject in accordance with the (E2) AWB setting information altered, and the display 17 displays the image based on the image signal.

In this way, according to the difference between the (B1) automatic color control information stored in the display image parameter storage unit 11 and the prescribed reference value, the camera system of the present embodiment alters the (E2) AWB setting information stored in the camera image parameter storage unit 21 in the direction to cancel out the difference, and adjusts colors the camera acquires to the direction opposite to the difference in colors displayed on the display, thereby enabling the display 17 to display in the same colors as the driver actually views the image.

Incidentally, although the foregoing example alters the (E2) AWB setting information of the camera image parameters in accordance with the(B1) automatic color control information of the display image parameters, it is also possible to alter, when altering another parameter of the display image parameters, the camera image parameter relating to that parameter altered.

For example, as for the (B2) white peak control information in the display image parameters, the camera system alters the (E3) AGC setting information, (E4) BLC setting information and (C9) black-and-white level control information in the camera image parameters. The (B2) white peak control information is information indicating the luminance range of the black and white of an image the display 17 displays. When a driver adjusts the white peak control information in such a manner that the image signal is displayed in a grayish color compared with white in the normal brightness, for example, and if the image signal transmitted from the camera unit 2 is displayed as it is without any adjustment, a white subject will be displayed in a grayish color on the display 17.

Accordingly, as for the (B2) white peak control information, just as the (B1) automatic color control information, the camera system extracts the difference from the reference value at which a white subject is expressed in white, and alters the (E3) AGC setting information, (E4) BLC setting information and (C9) black-and-white level control information stored in the camera image parameter storage unit 21 in accordance with the difference. Here, it alters the (E3) AGC setting information, (E4) BLC setting information and (C9) black-and-white level control information in such a manner that the luminance of the image signal taken with the camera 24 is increased when the (B2) white peak control information is set at a darker side of the reference value, and is reduced when it is set at a brighter side thereof. This enables the display 17 to display a white subject in white.

As described above, according to the camera system of the present embodiment, as to the color balance, for example, it sets as the reference values the display image parameters (display conditions) that will enable the image signal, which is acquired by taking a picture of a white subject as it is, to be displayed in white, that is, the set values that will enable the display 17 to display the subject just as it is taken with the camera 24 according to the camera image parameters (imaging conditions). Then, in accordance with the changes of the display conditions with respect to the reference values, it alters the imaging conditions corresponding to the changed display conditions to values that will cancel out the change of the display conditions so that the image displayed will become the same image as or an image with a small difference from the image displayed when the display conditions are the reference values. Accordingly, even when the display conditions are set at values different from the reference values, the camera system can display an image that will be perceived by the driver as the same or nearly the same image as an image the driver actually views. In addition, according to the camera system of the present embodiment, since it alters the imaging conditions indicating the manner in which the camera takes a picture of the subject, it can display a clearer image than when it performs image processing simply on the image signal output from the camera.

When altering the display conditions without using the reference values, a configuration is also possible which alters, according to the amounts of changes of the display conditions before and after the alteration, the imaging conditions corresponding to the changed display conditions to values that will cancel out the changes of the display conditions and give the same or nearly the same image as the image displayed in the display conditions before the alteration.

Incidentally, although the foregoing description is made by way of example of altering the (E2) AWB setting information of the camera image parameters in accordance with the (B1) automatic color control information of the display image parameters, and altering the (E3) AGC setting information and (E4) BLC setting information of the camera image parameters in accordance with the (B2) white peak control information of the display image parameters, other schemes are also possible. For example, the display 17 can display an image in a desired state by altering parameters having corresponding relations as shown in FIG. 8

Figure 8:
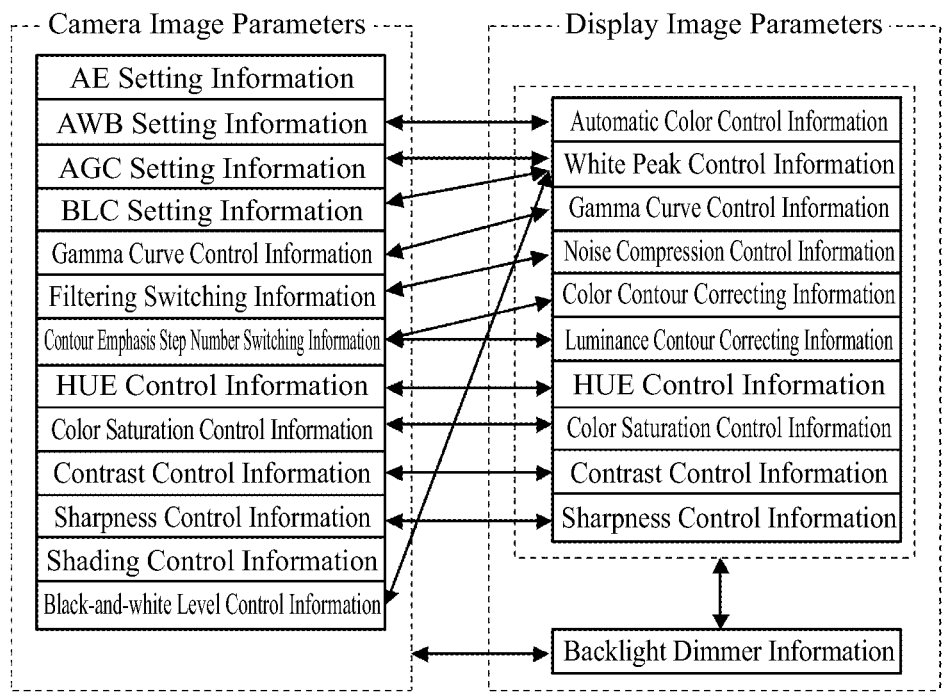
FIG. 8 is a diagram showing correspondence between camera image parameters and display image parameters in the camera system of the embodiment 2.

FIG. 8 is a diagram showing correspondence between the camera image parameters and the display image parameters. They have correspondence as follows.

(Display Image Parameters) ⇔ (Camera Image Parameters)
(B1) Automatic color control information ⇔ (E2) AWB set values.
(B2) White peak control information ⇔ (E3) AGC setting information, (E4) BLC setting information, and (C9) Black-and-white level control information.
(A1) Gamma curve control information ⇔ (C1) Gamma curve control information.
(A2) Noise compression control information ⇔ (C2) Filtering switching information.
(A3) Color contour correcting information ⇔ (C3) Contour emphasis step number switching information.
(A4) Luminance contour correcting information ⇔ (C3) Contour emphasis step number switching information.
(A5) HUE control information ⇔ (C4) HUE control information.
(A6) Color saturation control information ⇔ (C5) Color saturation control information.
(A7) Contrast control information ⇔ (C6) Contrast control information.
(A8) Sharpness control information ⇔ (C7) Sharpness control information.

Incidentally, alteration of the (B3) backlight dimmer information of the display image parameters has an effect to all the items of the display image parameters and camera image parameters except the (B3) backlight dimmer information itself. Accordingly, when the backlight dimmer information is altered, although it is preferable to alter all the display image parameters except the backlight dimmer information and all the camera image parameters, it is also possible to alter only parameters that have marked effect as in the embodiment 1.

As described above, the camera system of the present embodiment obtains the differences of the display image parameters (display conditions) from their reference values, and sets the values changed in accordance with the differences as the camera image parameters (imaging conditions). Accordingly, as for information the image signal cannot include in accordance with the camera image parameters that have been set originally, the camera system can include it into the image signal, thereby being able to reproduce a subject more faithfully on the display.

Embodiment 3

Figure 9:
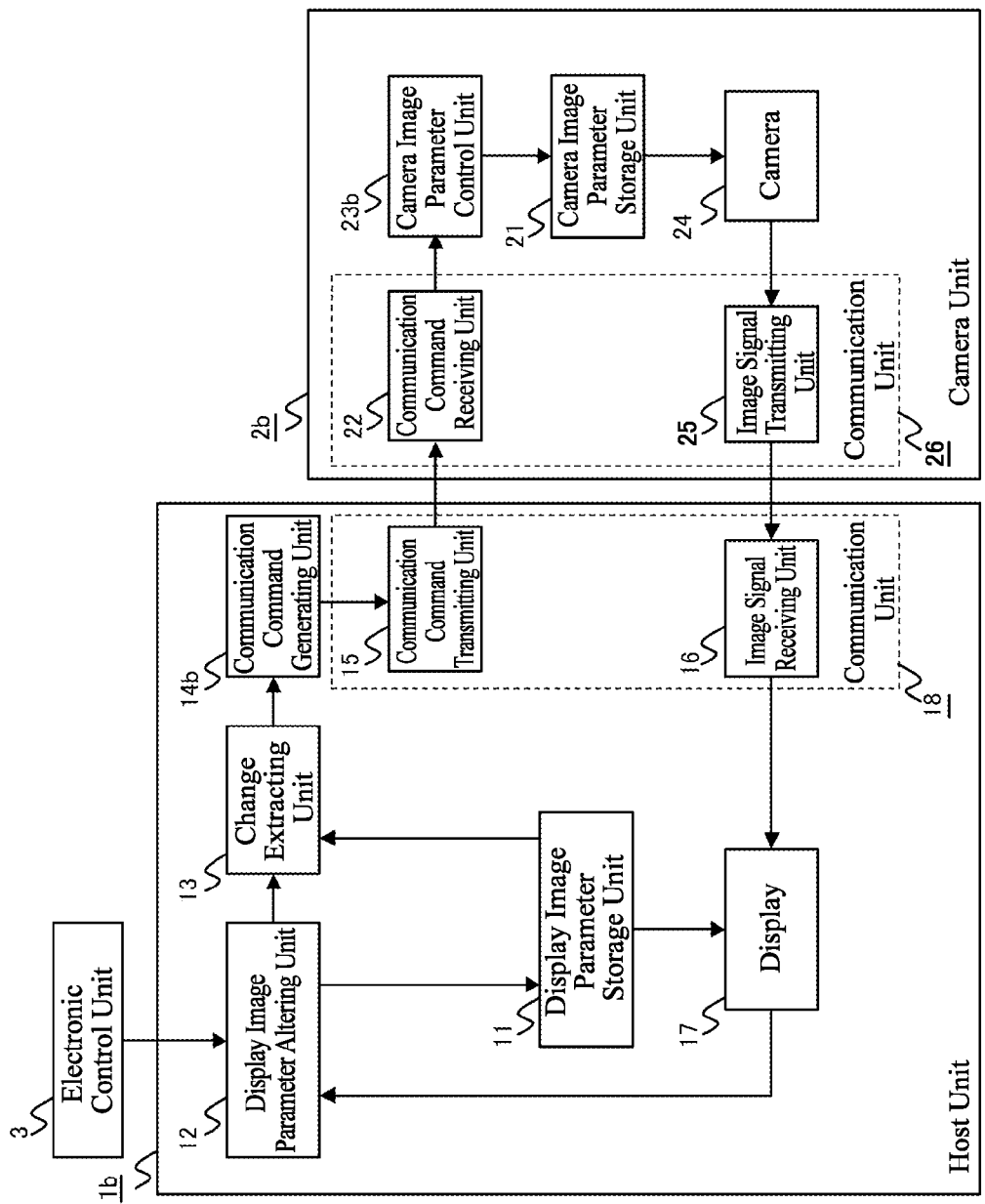
FIG. 9 is a block diagram showing a configuration of a camera system of an embodiment 3.

The embodiment 3 relates to a case where the camera unit 2b (imaging device) determines the imaging conditions corresponding to the display conditions. FIG. 9 is a block diagram showing a configuration of the camera system of the embodiment 3. In FIG. 9. the same or like components to those of FIG. 1 are designated by the same reference numerals and their description will be omitted.

The host unit 1b (display device) creates a communication command for transmitting information (changed parameters and the differences between them and their reference values) relating to the changed display image parameters (display conditions) extracted by the change extracting unit 13 to the camera unit 2b (imaging device).

The camera unit 2b has a camera image parameter control unit 23b (imaging condition decision unit and imaging condition altering unit). The camera image parameter control unit 23b acquires changed display image parameters and their differences from the communication command the communication command receiving unit 22 receives, determines the camera image parameters in accordance with the differences, and alters the camera image parameters stored in the camera image parameter storage unit 21 to the values determined.

The camera system of the embodiment 3 operates in nearly the same manner as the embodiment 1. It differs in that the host unit 1b transmits information about the changes of the display image parameters to the camera unit 2b, and the camera unit 2b determines the camera image parameters corresponding to the display image parameters after the change in accordance with the information received.

As the information about the changes of the display image parameters, differences before and after the changes can be transmitted instead of the differences from the reference values.

DESCRIPTION OF REFERENCE NUMERALS 1, 1a, 1b host unit (display device);
11 display image parameter storage unit (display condition storage unit);
12, 12a display image parameter altering unit (display condition altering unit);
13 change extracting unit (imaging condition decision unit);
14, 14a communication command generating unit (imaging condition decision unit);
14b communication command generating unit;
15 communication command transmitting unit;
16 image signal receiving unit;
17 display (display unit);
18 communication unit;
2, 2b camera unit (imaging device);
21 camera image parameter storage unit (imaging condition storage unit);
22 communication command receiving unit;
23 camera image parameter control unit (imaging condition altering unit);
23b camera image parameter control unit (imaging condition decision unit, imaging condition altering unit);
24 camera (imaging unit);
25 image signal transmitting unit;
26 communication unit;

What is claimed is:

1. An imaging system comprising:
an imaging device including an imaging condition storage that stores imaging conditions which are set values concerning imaging, an imaging unit that takes a picture of a subject in accordance with the imaging conditions stored in the imaging condition storage and generates an image signal, a first communication unit that communicates with a display device for displaying the image signal, and an imaging condition altering unit that alters the imaging conditions stored in the imaging condition storage in accordance with information received by the first communication unit;
a display device including a second communication unit that communicates with the imaging device, a display condition storage that stores display conditions which are set values concerning display, a display unit that displays the image signal received by the second communication unit in accordance with the display conditions stored in the display condition storage, and a display condition altering unit that alters the display conditions stored in the display condition storage; and an imaging condition decision unit that determines the imaging conditions corresponding to the display conditions, wherein in the display device which provides relationships between the display conditions and the imaging conditions, when the display condition altering unit alters the display conditions stored in the display condition storage, the imaging condition decision unit determines the imaging conditions corresponding to the display conditions after the alteration, and in the imaging device, the imaging condition altering unit alters the imaging conditions stored in the imaging condition storage to the imaging conditions the imaging condition decision unit determines, wherein the imaging device includes an image sensor whose functionality is dependent on at least one of the imaging conditions stored in the imaging condition storage, the at least one of the imaging conditions being alterable by said imaging condition altering unit, and the imaging condition decision unit determines the imaging conditions from an amount of change of the display conditions so as to cause the display unit to display the same or nearly the same image as the image to be displayed on the display unit before altering the display conditions.

2. The imaging system according to claim 1, wherein when the display condition altering unit alters the display conditions stored in the display condition storage in a direction of reducing intensity of emission of the display unit, the imaging condition decision unit determines the imaging conditions in a direction of reducing an upper limit of a luminance range in which the imaging unit takes a picture; and when the display condition altering unit alters the display conditions stored in the display condition storage in a direction of increasing the intensity of emission of the display unit, the imaging condition decision unit determines the imaging conditions in a direction of increasing the upper limit of the luminance range in which the imaging unit takes a picture.

3. The imaging system according to claim 2, wherein the imaging device and the display device are mounted on a vehicle, the imaging system further comprises a lighting signal acquiring unit that acquires a lighting signal indicating turning on or off lights mounted on the vehicle, the lighting signal acquiring unit supplies the lighting signal it acquires to the display condition altering unit, and the display condition altering unit, when receiving the lighting signal indicating turning on the lights, alters the display conditions stored in the display condition storage in the direction of reducing the intensity of emission of the display unit, and when receiving the lighting signal indicating turning off the lights, alters the display conditions stored in the display condition storage in the direction of increasing the intensity of emission of the display unit.

4. The imaging system according to claim 2, wherein the display condition altering unit alters the display conditions stored in the display condition storage in the direction of reducing or increasing the intensity of emission of the display unit in accordance with the present time.

5. The imaging system according to claim 2, wherein the display condition altering unit alters the display conditions stored in the display condition storage in the direction of reducing or increasing the intensity of emission of the display unit in accordance with the present date and time and position of the vehicle.

6. The imaging system according to claim 2, wherein the display condition altering unit alters the display conditions stored in the display condition storage in the direction of reducing or increasing the intensity of emission of the display unit in accordance with the present date and time and position and moving direction of the vehicle.

7. The imaging system according to claim 2, wherein the display condition altering unit alters the display conditions stored in the display condition storage in the direction of reducing or increasing the intensity of emission of the display unit in accordance with illuminance around the display device.

8. The imaging system according to claim 1, wherein the display unit comprises a backlight working as a light source, and an image display component that displays an image using light output from the backlight; and the display condition altering unit acquires panel information indicating a type of the image display component from the image display component, and alters the display conditions in accordance with the panel information.

9. The imaging system according to claim 1, wherein the display device comprises a reference display condition storage that stores reference values of the display conditions, wherein the imaging condition decision unit, when the reference display condition storage stores the reference values of the display conditions, determines the imaging conditions from differences between the reference values of the display conditions stored in the reference display condition storage and the display conditions stored in the display condition storage, thereby causing the display unit to display the same or nearly the same image as the image to be displayed on the display unit.

10. An imaging device connected to a display device that displays an image in accordance with display conditions which are set values concerning display and that outputs the display conditions to an outside, the imaging device comprising:

an imaging condition storage that stores imaging conditions which are set values concerning imaging;

an imaging unit that takes a picture of a subject in accordance with the imaging conditions stored in the imaging condition storage and generates an image signal;

a communication unit that supplies the image signal to the display device and receives the display conditions transmitted from the display device;

an imaging condition decision unit that determines the imaging conditions corresponding to the display conditions the communication unit receives; and an imaging condition altering unit that alters the imaging conditions stored in the imaging condition storage to the imaging conditions the imaging condition decision unit determines, wherein the imaging device includes an image sensor whose functionality is dependent on at least one of the imaging conditions stored in the imaging condition storage, the at least one of the imaging conditions being alterable by said imaging condition altering unit, and the imaging condition decision unit determines the imaging conditions from an amount of change of the display conditions so as to cause the display unit to display the same or nearly the same image as the image to be displayed on the display unit before altering the display conditions.

11. A display device connected to an imaging device that takes a picture in accordance with imaging conditions which are set values concerning imaging and that enables altering the imaging conditions from an outside, the display device comprising:
- a display condition storage that stores display conditions which are set values concerning display;
- a display unit that displays an image the imaging device takes in accordance with the display conditions stored in the display condition storage;
- a display condition altering unit that alters the display conditions stored in the display condition storage;
- an imaging condition decision unit that determines the imaging conditions corresponding to the display conditions; and
- a communication unit that communicates with the imaging device, wherein when the display condition altering unit alters the display conditions stored in the display condition storage, the imaging condition decision unit determines the imaging conditions corresponding to the display conditions after alteration, and the communication unit transmits the imaging conditions to the imaging device, and the imaging condition decision unit determines the imaging conditions such that:
- when the display condition altering unit alters the display conditions stored in the display condition storage in a direction of reducing intensity of emission of the display unit, the imaging condition decision unit determines the imaging conditions in a direction of reducing an upper limit of a luminance range in which the imaging device takes a picture; and
- when the display condition altering unit alters the display conditions stored in the display condition storage in a direction of increasing the intensity of emission of the display unit, the imaging condition decision unit determines the imaging conditions in a direction of increasing the upper limit of the luminance range in which the imaging device takes a picture.

* * * * *